(12) United States Patent
Fukui et al.

(10) Patent No.: US 11,858,250 B2
(45) Date of Patent: Jan. 2, 2024

(54) MULTILAYER STRUCTURE AND USES THEREOF

(71) Applicant: DOW TORAY CO., LTD., Tokyo (JP)

(72) Inventors: Hiroshi Fukui, Ichihara (JP); Takeaki Tsuda, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 453 days.

(21) Appl. No.: 16/955,852

(22) PCT Filed: Sep. 13, 2018

(86) PCT No.: PCT/JP2018/033959
§ 371 (c)(1),
(2) Date: Jun. 19, 2020

(87) PCT Pub. No.: WO2019/123739
PCT Pub. Date: Jun. 27, 2019

(65) Prior Publication Data
US 2020/0316908 A1 Oct. 8, 2020

(30) Foreign Application Priority Data
Dec. 22, 2017 (JP) .................. 2017-246951

(51) Int. Cl.
*B32B 7/12* (2006.01)
*B32B 7/06* (2019.01)
(Continued)

(52) U.S. Cl.
CPC .................. *B32B 7/12* (2013.01); *B32B 7/06* (2013.01); *B32B 27/08* (2013.01); *B32B 27/36* (2013.01);
(Continued)

(58) Field of Classification Search
CPC .. B32B 7/06; B32B 7/12; B32B 27/08; B32B 27/36; B32B 2307/202; B32B 2307/204;
(Continued)

(56) References Cited

U.S. PATENT DOCUMENTS

2003/0207118 A1 11/2003 Fukushi
2008/0156522 A1 7/2008 Shimada
(Continued)

FOREIGN PATENT DOCUMENTS

CN 1659028 A 8/2005
CN 101151728 A 3/2008
(Continued)

OTHER PUBLICATIONS

English translation of International Search Report for PCT/JP2018/033959 dated Oct. 23, 2018, 2 pages.
(Continued)

*Primary Examiner* — Christopher M Polley
*Assistant Examiner* — Sathavaram I Reddy
(74) *Attorney, Agent, or Firm* — Warner Norcross + Judd LLP

(57) ABSTRACT

This disclosure provides an electronic device member that is superior in ease of handling, without any loss of flatness or performance (e.g. flexibility and dielectric properties) despite being a dielectric sheet having a dielectric polymer cured material that is physically fragile. Disclosed herein is a layered body including (L1) a single layer or multiple layers of a high dielectric sheet that includes a polymer cured material having a dielectric functional group, and at least one (L2) pressure-sensitive adhesive layer, and in general further having (L3) an electrode layer and/or (L4) a non-silicone thermoplastic resin layer, and uses thereof.

8 Claims, 3 Drawing Sheets

(51) Int. Cl.
  *B32B 27/08*   (2006.01)
  *B32B 27/36*   (2006.01)
  *C09J 183/04*  (2006.01)
  *G06F 3/041*   (2006.01)

(52) U.S. Cl.
  CPC .......... *C09J 183/04* (2013.01); *G06F 3/0414* (2013.01); *B32B 2307/202* (2013.01); *B32B 2307/204* (2013.01); *B32B 2457/208* (2013.01); *G06F 2203/04103* (2013.01)

(58) Field of Classification Search
  CPC .............. B32B 2457/208; C09J 183/04; G06F 3/0414; G06F 2203/04103
  See application file for complete search history.

(56) References Cited

U.S. PATENT DOCUMENTS

| | | |
|---|---|---|
| 2012/0231245 A1 | 9/2012 | Kim et al. |
| 2015/0029412 A1 | 1/2015 | Kishioka et al. |
| 2016/0246154 A1* | 8/2016 | O'Keeffe ................ G02F 1/167 |
| 2016/0329562 A1 | 11/2016 | Akira et al. |
| 2017/0355173 A1 | 12/2017 | Tanaka et al. |
| 2018/0065347 A1 | 3/2018 | Fukui et al. |
| 2018/0332742 A1 | 11/2018 | Yamagata et al. |
| 2019/0127531 A1 | 5/2019 | Fukui et al. |

FOREIGN PATENT DOCUMENTS

| | | |
|---|---|---|
| JP | H09324173 A | 12/1997 |
| JP | 2006349736 A | 12/2006 |
| JP | 2010228295 A | 10/2010 |
| JP | 201303952 A | 1/2013 |
| JP | 2013512326 A | 4/2013 |
| JP | 2013139515 A | 7/2013 |
| JP | 2014522436 A | 9/2014 |
| WO | 2012166870 A1 | 12/2012 |
| WO | 2014105959 A1 | 7/2014 |
| WO | 2016098334 A1 | 6/2016 |
| WO | 2016140131 A1 | 9/2016 |
| WO | 2016163069 A1 | 10/2016 |
| WO | 2017104710 A1 | 6/2017 |
| WO | 2017183541 A1 | 10/2017 |
| WO | WO-2017200809 A1 * | 11/2017 ............. B32B 37/12 |

OTHER PUBLICATIONS

Machine assisted English translation of JP2006349736A obtained from https://patents.google.com/patent on Sep. 18, 2020, 11 pages.
Machine assisted English translation of JP2010228295A obtained from https://patents.google.com/patent on Sep. 18, 2020, 13 pages.
Machine assisted English translation of JP2013139515A obtained from https://patents.google.com/patent on Sep. 18, 2020, 14 pages.
Machine assisted English translation of WO2017104710A1 obtained from https://patents.google.com/patent on Sep. 18, 2020, 16 pages.
Machine assisted English translation of JPH09324173 obtained from https://patents.google.com/patent on May 24, 2022, 8 pages.

* cited by examiner

[Figure 1]
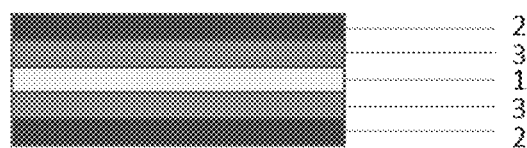
[Figure 2]
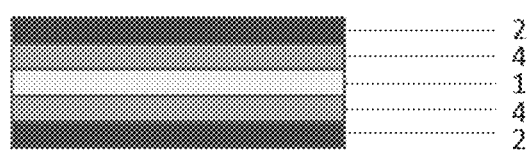
[Figure 3]
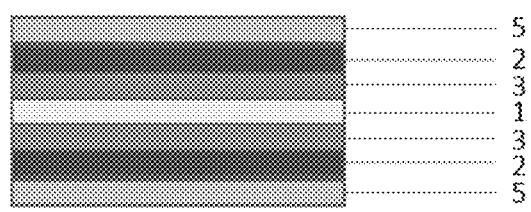
[Figure 4]
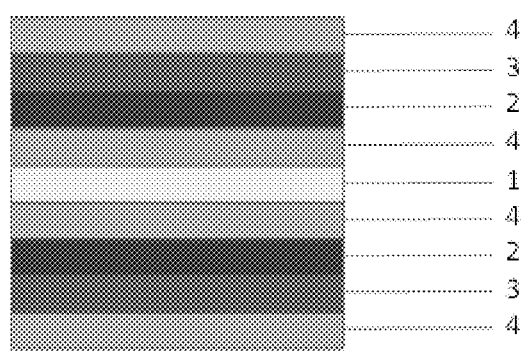

[Figure 5]
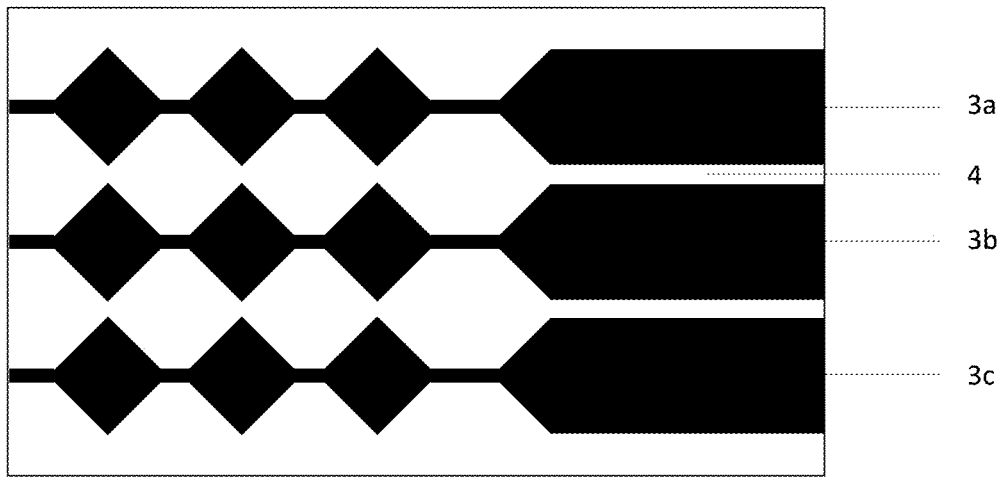
[Figure 6]
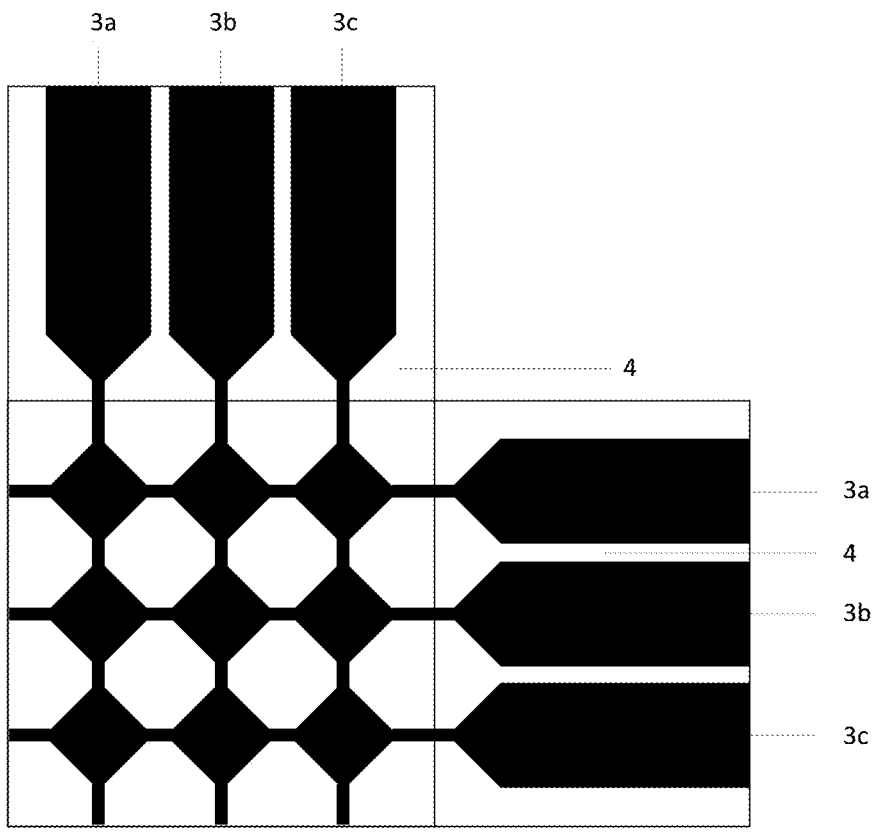

【Figure 7】

MULTILAYER STRUCTURE AND USES THEREOF

CROSS-REFERENCE TO RELATED APPLICATIONS

This application is the National Stage of International Appl. No. PCT/JP2018/033959 filed on 13 Sep. 2018, which claims priority to and all advantages of Japanese Appl. No. 2017-246951 filed on 22 Dec. 2017, the content of which is hereby incorporated by reference.

FIELD OF TECHNOLOGY

The present invention relates to a layered body that includes a pressure-sensitive adhesive layer and a high dielectric sheet that includes a polymer cured material, to a member for a transducer or a member for a display device comprising said layered body, and to a method for manufacturing an electrical or electronic component, transducer, or display device that uses said layered body.

PRIOR ART

Various types of pressure-sensitive adhesive agent compositions have superior tackiness in respect to adhered materials, and can form pressure-sensitive adhesive layers with superior interface releaseability from release liners through coating onto the release liners and then curing, where appropriate selections are made for use from acrylics, rubbers, and polysiloxanes depending on the adhesive strength, transparency, adhesive layer tackiness characteristics, pealing mode (cohesive fracturing or interfacial release), temperature conditions for use (ability to withstand heat or cold), and the like. In particular, polysiloxane-based pressure-sensitive adhesive agent compositions are superior in terms of electrical insulation, thermal durability, ability to withstand cold, tackiness in respect to various types of adhered materials, and the like, and thus are used in thermally durable adhesive tapes, electrically insulating adhesive tapes, heat sealing tapes, masking tapes for plating, and the like. The compositions of these polysiloxane-based pressure-sensitive adhesive agents are classified by the curing mechanisms thereof into classes such as addition reaction curable, condensation reaction curable, peroxide curable, and the like. Addition reaction curable pressure-sensitive adhesive agent compositions are used widely due to the ability to cure rapidly at room temperature or through heating, and because they do not produce byproducts.

On the other hand, given the broad range of options in terms of types, adhesive characteristics, and the like, in recent years there has been research into application of pressure-sensitive adhesive agent compositions to the field of leading-edge electronic display elements in, for example, smart devices. In such devices a structure is used wherein films that are structured from a plurality of layers, including electrode layers and display layers, are held between transparent substrates, where a variety of pressure-sensitive adhesive agents are used, depending on the conditions of use, for the purpose of protecting the electrode layers and the display layers, and for improving adhesion between layers, and effective application thereto is anticipated. For example, in examples of use of a polysiloxane-based pressure-sensitive adhesive agent composition, manufacturing of an optically transparent silicone-based pressure-sensitive adhesive agent film, and a displaying device, such as a touch panel, using the same, are disclosed in, for example, Japanese Translation of PCT International Application Publication 2014-522436 (Patent Document 1), Japanese Translation of PCT International Application Publication 2013-512326 (Patent Document 2), and the like.

On the other hand, in these smart devices, high dielectric characteristics are listed among the material characteristics that are required in display device applications that include touch panels or transducer devices that include pressure sensors and/or actuators. The applicants have proposed that organopolysiloxane cured materials that include fluoroalkyl groups have a high relative dielectric constant, and would be useful as a transducer material (International Patent Application Publication WO 2014/105959, Patent Document 3, etc.).

Moreover, the present applicants discovered that it is possible to provide a high-performance dielectric layer through the use of an organopolysiloxane cured material that includes a specific fluoroalkyl group, and have proposed the dielectric materials relating to International Patent Application Publication WO 2016/098334 (Patent Document 4), and International Patent Application Publication WO 2016/163069 (Patent Document 5). Moreover, these dielectric organopolysiloxane cured materials that include fluoroalkyl groups, when used in applications as electronic materials in touch panels, and the like, or as electronic materials for display devices, and, in particular, as transducer materials for sensors, actuators, and the like, may need to be formed into the form of films, where preferably it would be possible to produce a cured material in the form of a uniform film, and thus in International Patent Application Publication WO 2017/183541 (Patent Document 6) a high dielectric film that is superior in flatness, of an organopolysiloxane cured material that includes fluoroalkyl groups, is proposed.

These organopolysiloxane cured materials that include fluoroalkyl groups have the benefits of having superior transparency, the ability to design the adhesive strength and hardness (gel through elastomer) thereof as desired, good processing characteristics for manufacturing a formed product, such as a film, and a high relative dielectric constant. Moreover, there are also benefits of fast curing, with essentially no contraction during the forming process, and ease in setting the desired curing conditions.

PRIOR ART DOCUMENTS

Patent Documents

[Patent Document 1] Published Japanese Translation of a PCT Application Originally filed in English 2014-522436
[Patent Document 2] Published Japanese Translation of a PCT Application Originally filed in English 2013-512326
[Patent Publication 3] International Patent Application Publication WO 2014/105959
[Patent Publication 4] International Patent Application Publication WO 2016/098334
[Patent Publication 5] International Patent Application Publication WO 2016/163069
[Patent Publication 6] International Patent Application Publication WO 2017/183541

SUMMARY OF THE INVENTION

Problem Solved by the Present Invention

However, the inventors in the present application discovered new issues in the dielectric materials proposed in Patent Documents 3 through 6, above. While there is the need for an extremely flat sheet-shaped member (including film-shaped members) that includes a high dielectric polymer cured material, as typified by dielectric organopolysiloxane cured materials that include fluoroalkyl groups, as electronic materials for touch panels, and the like, as electronic members for display devices, and, in particular, as transducer materials for sensors, actuators, and the like, when dielectric sheets, particularly those in the form of thin films, are packaged into devices, sometimes damage may occur caused by the flexibility and physical strength of the film-shaped member, or the flatness may be reduced (through wrinkles or cracking of a level that is not apparent to the naked eye), so that the dielectric sheet that includes the high dielectric polymer cured material becomes unable to exhibit adequate performance. This problem is particularly significant in dielectric polymer cured materials of a gel form that is of superior flexibility. While this problem can be solved partially through increasing the physical strength of the high dielectric polymer cured material (for example, the hardness thereof), in the applications described above, there is sometimes the need for a high level of flexibility for the dielectric sheet, or gel-type physical properties/stress relaxation characteristics, and thus there is a problem in that device performance cannot be secured through simply increasing the physical strength. On the other hand, while theoretically it should be possible to exercise care so as to mount the member in the device so as to not damage the shape or flatness of a fragile dielectric sheet, in an industrial production process this ties directly into negative effects on manufacturing efficiency for the device, and to reduced yields, and thus this would not constitute an adequate solution.

Consequently, there is a strong need for a high dielectric material wherein the member can be packaged into a device using a relatively easy manufacturing process, able to improve the ease of handling, without any loss of flatness or performance, even with a dielectric sheet that includes a physically fragile dielectric polymer cured material, while being superior in flexibility and dielectric performance.

Means for Solving the Problem

As a result of earnest research in order to solve the problems described above, the present inventors discovered that the problems described above can be solved through the use of a layered body that includes (L1) a high dielectric sheet that includes a single layer or multiple layers of a polymer cured material that has a dielectric functional group, and (L2) at least one pressure-sensitive adhesive layer, thereby arriving at the present invention. The layered body that includes the high dielectric sheet, through the combination of the pressure-sensitive adhesive layer, enables handling of the layered body as a whole as a member for a transducer or a member for a display device, which improves physical strength, as a member, when compared to the case of handling the dielectric polymer cured material alone, and, through the use of the pressure-sensitive adhesive layer, can be packaged easily in various types of devices. This makes it possible to improve the ease of handling, without any damage whatsoever to the relative dielectric constant or flatness of the high dielectric sheet.

That is, the object of the present invention is achieved through:

[1] a layered body that includes: (L1) a high dielectric sheet that includes a single layer or multiple layers of a polymer cured material that has a dielectric functional group, and (L2) at least one pressure-sensitive adhesive layer.

The object of the present invention may be achieved suitably through a layered body having a structure as described below.

[2] A layered body as set forth in [1], having a structure wherein: (L1) a single layer or multiple layers of a high dielectric sheet that includes a polymer cured material having a dielectric functional group, or a layered structural unit including the high dielectric sheet, is held between the at least two (L2) pressure-sensitive adhesive layers.

[3] A layered body as set forth in [1] or [2], further comprising: (L3) an electrode layer and/or (L4) a non-silicone thermoplastic resin layer.

[4] A layered body as set forth in any one of [1] through [3], having: (L3) an electrode layer and/or (L4) a non-silicone thermoplastic resin layer on at least one face of (L1) a single layer or multiple layers of a high dielectric sheet that includes a polymer cured material having a dielectric functional group.

[5] A layered body as set forth in any one of [1] through [4], comprising: (L3) an electrode layer and/or (L4) a non-silicone thermoplastic resin layer on at least one face of the (L2) pressure-sensitive adhesive layer.

[6] A layered body as set forth in any one of [1] through [5], wherein: the high dielectric sheet that includes the polymer cured material having the dielectric functional group and the pressure-sensitive adhesive layer are substantially transparent.

[7] A layered body as set forth in any one of [1] through [6], wherein: the polymer cured material having the dielectric functional group is an organopolysiloxane cured material that includes a fluoroalkyl group.

[8] A layered body as set forth in any one of [1] through [7], wherein: the polymer cured material having the dielectric functional group is an organopolysiloxane cured material that includes a fluoroalkyl group with a shear storage modulus in a range of between $10^3$ and $10^5$ Pa at 23° C.

[9] A layered body as set forth in any one of [1] through [8], wherein: the polymer cured material having the dielectric functional group is an organopolysiloxane cured material that includes a fluoroalkyl group wherein a curable organopolysiloxane composition that includes at least an organopolysiloxane wherein no less than 10 mol % of all substituents for silicon atoms include a fluoroalkyl group that is a fluoroalkyl group that is expressed by $(C_pF_{2p+1})$—R— (where R is an alkylene group with a carbon number between 1 and 10 and p is a number in the range of 1 through 8) that is cured.

[10] A layered body as set forth in any one of [1] through [9], wherein: the (L2) pressure-sensitive adhesive layer is a silicone-based pressure-sensitive adhesive layer comprising a cured material of a curable silicone composition including: (A) a straight or branched organopolysiloxane having an average number of curing reaction functional groups in the molecule in excess of 1; (B) an organopolysiloxane resin; and (C) a curing agent.

The object of the present invention may be achieved through a releasable layered body as described below.

[11] A layered body as set forth in any one of [1] through [10], further comprising: a (L5) separator that is provided with a release surface that faces the (L2) pressure-sensitive adhesive layer.

Similarly, the object of the present invention may be achieved through an electronic device, or through a member thereof, that includes the layered body described below.

[12] An electrical or electronic component, transducer, or display device that includes a layered body as set forth in any one of [1] through [10].

[13] An electrical or electronic component, a transducer member, or a display device member comprising, a layered body as set forth in any one of [1] through [10].

Furthermore, the object of the present invention may be achieved through a method for manufacturing an electronic device, described below, using the layered body described above:

[14] A method for manufacturing an electrical or electronic component, a transducer, or a display device including a step for placing, within the device, a layered body as set forth in any one of [1] through [10].

[15] A method for manufacturing an electrical or electronic device, a transducer, or a display device, including: (I) a step for removing the (L5) separator from the layered body described in [11]; and (II) a step for placing, in the device, a layered body that has, on an outer layer, a pressure-sensitive adhesive layer, obtained in step (I), above.

Effects of the Invention

The present invention enables the provision of a member for an electronic device that is superior in ease of handling, without any damage to the flatness or performance (flexibility and dielectric performance), despite being a dielectric sheet that includes a dielectric polymer cured material that is physically fragile. Moreover, the layered body according to the present invention enables mounting of said member into a desired device through a relatively simple manufacturing process in the industrial production process. Because of this, the use of the layered body according the present invention enables electrical and electronic components, transducers, and transparent devices with superior performance to be produced with good production efficiency using a layered body according to the present invention.

BRIEF DESCRIPTIONS OF THE DRAWINGS

FIG. 1 depicts a schematic view of a layered body according to one embodiment according to the present invention.

FIG. 2 depicts a schematic view of a layered body according to one embodiment according to the present invention.

FIG. 3 depicts a schematic view of a layered body according to one embodiment according to the present invention.

FIG. 4 depicts a schematic view of a layered body according to one embodiment according to the present invention.

FIG. 5 depicts a top view of a layered body (3+4) that includes an electrode layer wherein three electrode layers (3a, 3b, and 3c) are layered on top of a PET film (4).

FIG. 6 depicts a top view of a layered body wherein a pair of the layered bodies (3+4) that include electrode layers, of FIG. 5, are disposed at angles that are shifted respectively by 90°, and a layered body (1+4) that includes a high dielectric sheet (1) and a PET film (4) is held, from above and below, between the pair of layered bodies (3+4) that include electrode layers.

FIG. 7 depicts a side view of a layered body wherein a pair of the layered bodies (3+4) that include electrode layers, of FIG. 5, are disposed at angles that are shifted respectively by 90°, and a layered body (1+4) that includes a high dielectric sheet (1) and a PET film (4) is held, from above and below, between the pair of layered bodies (3+4) that include electrode layers.

FORMS FOR CARRYING OUT THE PRESENT INVENTION

Summary of Layered Body

A layered body according the present invention will be explained in detail first. The layered body according to the present invention is a layered body that includes (L1) a high dielectric sheet that includes a single layer or multiple layers of a polymer cured material that has a dielectric functional group, and (L2) at least one pressure-sensitive adhesive layer, and may also have (L3) an electrode layer, and (L4) one or more selections from non-silicone thermoplastic resin layers, where another protective layer, a non-silicone adhesive layer, an optical functional layer such as a reflective layer, or the like, may be provided between any of the layers, or as outside layers, as desired. The layered body that has these functional layers can, itself, be used as a member for an electronic device, and can function as a dielectric layer and as a functional layer structural unit that includes a dielectric layer, through disposition thereof within the device.

Moreover, electrode or protective layers may further be provided on these layered bodies, depending on the type of device. The layered body is particularly useful as a member for an electrical or electronic component, a transducer, or a display device, or, in particular, as a member that includes a dielectric member, and can improve the production efficiency and yields of various types of devices, with superior ease of handling in the industrial production processes.

On the other hand, the layered body according the present invention may instead be a releasable layered body that further includes a (L5) separator that is provided with a release surface that faces the (L2) pressure-sensitive adhesive layer of the layered body described above. This type of releasable layered body can be manufactured, shipped, and stored in a form that includes the separator, so has the benefit of superior productivity and ease of handling. Moreover, by peeling the separator to expose the pressure-sensitive adhesive layer, the layered body, with the separator removed, can be used as a member for an electronic device, the same as described above. Moreover, the releasable layered body, after the separator is separated, has a pressure-sensitive adhesive layer on at least one surface of an outer layer, and thus has the benefit of the ability to place the layered body on a desired device through the use of the pressure-sensitive adhesive layer. Note that the (L5) separator substrate may be a thermoplastic resin film that is identical to the (L4) non-silicon thermoplastic resin layer, where ultimately this layer is peeled off, and the meaning of the functional layer will differ depending on whether or not the layer is ultimately removed for placement onto a device.

[(L1) High Dielectric Sheet]

A high dielectric sheet that includes a polymer cured material that has a dielectric functional group is one essential feature of the layered body according to the present invention, and is the layer that functions as a dielectric layer when disposed on the device. The layer may be a single-layer high dielectric sheet structured from a polymer cured material that is molded in the form of a single sheet, but may instead be a multilayer high dielectric sheet formed from multiple sheets of polymer cured materials that may be either mutually identical or mutually different. The multilayer high dielectric sheet can more easily be made into a thick film when compared to a high dielectric sheet of a single layer, and layering high dielectric polymer cured materials having different physical properties, such as hardnesses, dielectric constants, or thicknesses (for example, a polymer cured material in the form of a gel and a polymer cured material in the form of an elastomer, or polymer cured materials of different dielectric constants, etc.) makes it possible to adjust the physical properties of the high dielectric sheet as a whole. Moreover, layering polymer cured material sheets that are anisotropic, such as stretched sheets, in either identical directions or perpendicular directions, enables adjustment of the physical properties of the high dielectric sheets as a whole.

There is no particular limitation on the type of polymer cured material that has the dielectric functional group, and a single type, or combinations of two or more types of polymers, may be selected from identical or different publicly known dielectric polymers. Specific examples include acrylic polymers, urethane polymers, siloxane polymers, and mixtures thereof (including hybrid polymer mixtures). As described above, the high dielectric sheet according the present invention may be of multiple layers, and thus it may be a high dielectric sheet of layers of polymer cured materials having different types of dielectric functional groups with different physical properties, and may be a high dielectric sheet wherein layers of different types of polymer cured materials are layered (for example, a layered body of a urethane polymer layer and a siloxane polymer layer). Note that, from the perspective of electrical insulation performance, thermal durability, and ability to withstand cold (in particular, in suppressing a change in physical properties at low temperatures in particular), preferably the high dielectric sheet according the present invention uses a siloxane-based polymer layer.

The dielectric functional group is a functional group that applies dielectric properties to the polymer cured material and to the high dielectric sheet made therefrom, and while there is no particular limitation thereon, it may be, for example: a) a halogen atom or a group that includes a halogen atom, such as a fluoroalkyl group, including fluoromethyl groups, 3-fluoropropyl groups, and 3,3,3-trifluoropropyl groups, or a fluoroalkyl group; b) a group that includes a nitrogen atom, such as a cyano group (for example, a cyanopropyl group or a cyanoethyl group); c) a group that includes oxygen atom, such as an ester group, or the like; d) a complex cyclic group such as an imidazole group, a pyridine group, a phthalocyanine group, or the like; e) a boronated group such as a borate ester group, a borate group, or the like; f) a group that includes phosphorus such as, for example, a phosphine group, a phosphine oxide group, a phosphonic acid ester group, a phosphorus acid ester group, a phosphoric acid ester group, or the like; g) a group that includes sulfur, such as a thiol group, a sulfone group, a thioketone group, a sulfonic acid ester group, or a sulfonamide group, or the like. The polymer cured material that structures the high dielectric sheet may include one or more types of these dielectric functional groups, and there is no particular limitation on the inclusion proportions thereof.

Moreover, there is no particular limitation on the means for introducing the dielectric functional group into the polymer cured materials described above, where the polymer of a curing reaction polymer that is modified with a dielectric functional group may be cured, a compound that has the dielectric functional group may be added and dispersed into the polymer matrix, a compound having a dielectric functional group and a reactive functional group may be introduced into a polymer matrix that is curable through a curing reaction polymer, a compound that has a dielectric functional group that is compatible with a curing reaction polymer may cause a polymer cured material to swell, or an arbitrary filler treatment using a compound that has a dielectric functional group may be performed to add the compound, together with the filler, to the curing reaction polymer, to cure the material as a whole.

The curing reaction that is applied to the polymer curing material that has the dielectric functional group is arbitrary, where there is no particular limitation on the curing system that can be used with the acrylic polymer cured material, urethane polymer cured material, or siloxane polymer cured material, and a single type or a combination of two or more types may be used. Preferably a condensation curable, addition curable, peroxide curable, radical reaction curable, or light or energy beam curable polymer cured material is used.

Other arbitrary additives, such as fillers, may be included in the polymer cured material having the dielectric functional group in a range that does not negatively affect the technological effects and function of the dielectric layer of the present invention. Specifically, they may include one or more inorganic particles selected from a group comprising dielectric inorganic particles and reinforcing inorganic particles that can be used for surface treatments, mold releasing agents, insulation modifiers, adhesive improving agents, and the like. Note that these components, and similar materials, are similar to the components disclosed in Patent Documents 3 through 6, listed above, and may be added with no particular limitations to siloxane polymer cured materials and polymer cured materials that have other dielectric functional groups.

Preferably the high dielectric sheet that includes a polymer cured material having a dielectric functional group, listed above, is substantially flat, and suitably the difference in thicknesses between the end of the sheet and the thickness at the center of the sheet is no more than 5.0%, and the thickness at the center of the sheet is in a range of between 5 and 1000 μm. Moreover, as described above, the high dielectric sheet may be a single layer or may be multiple layers, and may be used for the purpose of forming a dielectric sheet in excess of 1000 μm through layering a plurality of sheets together to form a dielectric layer with high capacity that can be used in a device such as any of a variety of transducers.

The high dielectric sheet according the present invention may be transparent or opaque, depending on the application. On the other hand, when the polymer cured material is a polymer matrix with superior transparency, such as an organopolysiloxane cured material that includes fluoroalkyl groups, it will be substantially transparent unless a coloring agent, a filler with a large particle diameter, or the like, is mixed in. Here "substantially transparent" means transparent visually when a film-type cured material with a thickness of between 50 and 1000 μm is formed, wherein, in general, the transparency to light with a wavelength of 450 nm is no less than 80%, indexed to the value for air being 100%.

The high dielectric sheet of the present invention, from the perspective of dielectric performance, has a relative dielectric constant, at 1 kHz and 25° C., of no less than 4, and preferably no less than 5, and more preferably no less than 6. Note that the polymer cured material is an organopolysiloxane cured material that includes fluoroalkyl groups, where the use of a cured material of a curable organopolysiloxane composition that includes at least an organopolysiloxane that includes fluoroalkyl groups wherein at least 10 mol % of all substituents for silicon atoms are specific fluoroalkyl groups, such as trifluoropropyl groups, enables a high dielectric sheet with a relative dielectric constant of 6 or 7 to be designed relatively easily.

When the high dielectric sheet according to the present invention is used in an application as an electronic material for a touch panel, or the like, or an electronic member for a display device, or, in particular, as a transducer material for a sensor, or the like, preferably the shear storage modulus at 23° C. is in a range of between $10^3$ and $10^5$ Pa, and more preferably in a range of between $1.0 \times 10^3$ through $5.0 \times 10^4$ Pa. Moreover, through arbitrary selections, preferably the compression residual strain (%) of the high dielectric sheet of the present invention is less than 10%, where less than 5% is more preferable, and no more than 4% is particularly preferable. Similarly, preferably the compressibility (%) is no less than 15%, more preferably no less than 18%, and particularly preferably no less than 20%. The means for measuring these are the same as in Patent Document 6 (International Patent Application Publication WO 2017/183541), referenced above.

There are no particular limitations on the nature of the high dielectric sheet according to the present invention, and while it may be in the form of a flexible gel, an elastomer with superior viscoelasticity, or a hard resin, from the perspective of the technological effect of the present invention, the high dielectric sheet as a whole being in the form of a gel or an elastomer is particularly preferred. In particular, the layered body according to the present invention may be used for the purpose of placing onto a device, with good efficiency, a high dielectric sheet of a gel type, which, by itself, would be poor in ease of handling.

An organopolysiloxane cured material that includes fluoroalkyl groups proposed in Patent Documents 3 through 6, above, is particularly well-suited as the high dielectric sheet according to the present invention, and preferably is a material wherein a curable organopolysiloxane composition that includes at least an organopolysiloxane where at least 10 mol % of all substituents on silicon atoms include fluoroalkyl groups that are fluoroalkyl groups represented by $(C_pF_{2p+1})$—R— (where R is an alkylene group with a carbon number between 1 and 10, and p is a number in the range of between 1 and 8) has been cured. In particular, a high dielectric sheet that is a single sheet or a multilayer sheet that combines a plurality of sheets, of a flat gel sheet made from an organopolysiloxane cured material that includes a fluoroalkyl group that includes a 3,3,3-trifluoropropyl group, and which is substantially transparent, is particularly preferred. A high dielectric sheet that is formed through inclusion of an organopolysiloxane cured material that includes fluoroalkyl groups exhibits characteristics of having a low adhesive strength, a high compression ratio, and good recovery characteristics. Moreover, even at low temperatures of, for example, less than 0° C., there is little change in the physical properties listed above, making it possible to achieve sensor sensitivity that is highly stabilized over a broad temperature range, with superior pressure responsiveness even under low pressures, when applied as a dielectric layer for a display device such as a touch panel.

The high dielectric sheet according to the present invention may be produced through forming a coating film through coating onto another functional layer, suitably onto a silicone pressure-sensitive adhesive layer or non-silicone thermoplastic resin layer, in a structure wherein the curable polymer composition described above (suitably a curable organopolysiloxane composition that includes at least an organopolysiloxane that includes fluoroalkyl groups), and curing, under desired conditions, to produce a cured material, or may be produced through coating the curable silicone composition, described above, onto another releasable substrate and curing, and peeling the cured material from the releasable substrate and applying to another functional layer or to a layered structural unit that includes the other functional layer.

The coating method may be, for example, gravure coating, offset coating, offset gravure, roller coating, reverse-roller coating, air knife coating, curtain coating, or comma coating.

Note that with the high dielectric sheet according to the present invention, a rolling process may be carried out either prior to the curing reaction or following the curing reaction for the curable polymer composition. The rolling process may also be carried out on the polymer cured material in a cured through semi-cured state, or on a polymer semi-cured material, but curing through heating or the like after performing the rolling process on an uncured curable polymer composition to produce a polymer cured material that is flat and uniform is preferred. Moreover, when carrying out the rolling process, a flat and uniform layer structure may be obtained through curing, through heating, or the like, after a rolling process on the entire layered body wherein an uncured pressure-sensitive adhesive layer and curable polymer composition are coated, with a separator that has a release layer, described below, therebetween, and is preferred.

[(L2) Pressure-Sensitive Adhesive Layer]

The pressure-sensitive adhesive layer may be a pressure-sensitive adhesive layer (outermost layer) that enables placement, through contact bonding to a device, of the high dielectric sheet described above, or a layered structural unit that includes the high dielectric sheet, described above, and is a layer that is different from the polymer cured layer that has the dielectric functional groups, described above, or may be an intermediate layer for improving inter-layer adhesion between the other functional layers that structure the layered body. The provision of the pressure-sensitive adhesive layer improves the utility as a member, depending on the placement, in addition to enabling an improvement in the ease of handling, when handling the layered body itself as a member for an electronic device, through physically reinforcing and integrating the entirety of the layered body, including the high dielectric sheet.

The type, physical nature, and adhesive characteristics of the pressure-sensitive adhesive layer according to the present invention can be selected as appropriate depending on the types of layer structural units and of the device, the use conditions, and the manufacturing process, and there is no particular limitation on the thickness or method for forming the pressure-sensitive adhesive layer according to the present invention. The pressure-sensitive adhesive layer that can be used in the present invention may be, for example, a rubber pressure-sensitive adhesive agent, an acrylic pressure-sensitive adhesive agent, a silicone pressure-sensitive adhesive agent, a vinyl alkyl ether pressure-sensitive adhesive agent, a polyester pressure-sensitive adhesive agent, a polyimide pressure-sensitive adhesive agent, a urethane pressure-sensitive adhesive agent, a fluorine pressure-sensitive adhesive agent, a polyvinyl pyrrolidone pressure-sensitive adhesive agent, a polyacrylamide pressure-sensitive adhesive agent, a cellulose pressure-sensitive adhesive agent, or the like, and, depending on the purpose, these may further include well-known heat resistance additives, tackifying agents, plasticizing agents, filling agents, oxide inhibitors, antiaging (anti-degradation) agents, optical stabilizing agents, flame retardants, antistatic agents, dyes, pigments, and the like.

Suitably, the pressure-sensitive adhesive agent according to the present invention may be structured from one or more types of pressure-sensitive adhesive agents selected from rubber pressure-sensitive adhesive agents, acrylic pressure-sensitive adhesive agents, and silicone pressure-sensitive adhesive agents, or may be a pressure-sensitive adhesive agent of a compound type wherein two types are mixed, layered, or grafted, such as acryl-silicone systems.

For the pressure-sensitive adhesive agent according to the present invention, silicone pressure-sensitive adhesive agent layers, acrylic pressure-sensitive adhesive layers, and combinations thereof are particularly preferred. These pressure-sensitive adhesive agent layers can be provided, as necessary, with thermal durability, resistance to cold, and durability and, if desired, a substantially transparent pressure-sensitive adhesive agent can be provided easily, and, additionally, the adhesive strength can be adjusted easily, enabling suppression of paste transfer or residual adhesive within the device, and thus has the benefit of superior reworkability accompanying re-adhesion, or the like.

Depending on the application, the pressure-sensitive adhesive agent layer according to the present invention may be a substantially transparent pressure-sensitive adhesive agent layer. Here, as described above, "substantially transparent" means transparent visually when a film-type cured material with a thickness of between 50 and 1000 μm is formed, wherein, in general, the transparency to light with a wavelength of 450 nm is no less than 80%, indexed to the value for air being 100%.

While there is no particular limitation on the adhesive strength of the pressure-sensitive adhesive agent layer in the present invention, preferably the adhesive strength is no less than 5 N/m in the case of peeling at an angle of 180° at a speed of 300 mm/m in a 23° C., 50% humidity environment for a test piece wherein a polyethylene terephthalate (PET) substrate (with a thickness of 50 μm) is adhered to both faces of a pressure-sensitive adhesive layer that has a thickness of 100 μm, where 10 N/m is more preferred.

The rubber pressure-sensitive adhesive agent may be a rubber pressure-sensitive adhesive agent that has, as the base polymer, a natural rubber or any of a variety of synthetic rubbers such as, for example, a polyisoprene rubber, a styrene/butadiene block copolymer (SB) rubber, a styrene/isoprene block copolymer (SI) rubber, a styrene/isoprene/styrene block copolymer (SIS) rubber, a styrene/butadiene/styrene block copolymer (SBS) rubber, a styrene/butadiene/styrene block copolymer (SIBS) rubber, a styrene/ethylene/butylene/styrene block copolymer (SEBS) rubber, a styrene/ethylene/propylene/styrene block copolymer (SEPS) rubber, a styrene-ethylene-propylene block copolymer (SEP) rubber, recycled rubber, a butyl rubber, polyisobutylene, or modified products thereof.

The acrylic pressure-sensitive adhesive agent may be an acrylic pressure-sensitive adhesive agent that has, as the base polymer, an acrylic polymer (homopolymer or copolymer) that uses, as a monomer component, one or more types of (meth) acrylic acid alkyl esters. The (meth) acrylic acid alkyl ester in the acrylic pressure-sensitive adhesive agent may be a C1 through 20 alkyl ester (meth) acrylate such as methyl (meth) acrylate, ethyl (meth) acrylate, propyl (meth) acrylate, isopropyl (meth) acrylate, butyl (meth) acrylate, isobutyl (meth) acrylate, s-butyl (meth) acrylate, t-butyl (meth) acrylate, pentyl (meth) acrylate, hexyl (meth) acrylate, heptyl (meth) acrylate, octyl (meth) acrylate, 2-ethylhexyl (meth) acrylate, (meth) isooctyl acrylate, nonyl (meth) acrylate, isononyl (meth) acrylate, decyl (meth) acrylate, isodecyl (meth) acrylate, undecyl (meth) acrylate, dodecyl (meth) acrylatetridecyl (meth) acrylate, tetradecyl (meth) acrylate, pentadecyl (meth) acrylate, hexadecyl (meth) acrylate, heptadecyl (meth) acrylate, octadecyl (meth) acrylate, nonadecyl (meth) acrylate, eicosyl (meth) acrylate (and preferably a C4 through 18 alkyl (straight-chain or branched alkyl) ester (meth) acrylate), or the like. Note that the acrylic polymer may include a unit corresponding to another monomer component that can copolymerize with the (meth) acrylic acid alkyl ester, if necessary, for the purpose of modifying the cohesive force, thermal durability, cross-linking performance, or the like. The reactive (meth) acrylic acid alkyl ester, in the presence of a polymerization initiator, is cured through exposure to a high energy beam such as ultraviolet radiation, to form an acrylic pressure-sensitive adhesive layer.

For the silicone pressure-sensitive adhesive agent layer according the present invention, a cured material of a curable silicone composition that includes:

(A) a straight-chain or branched organopolysiloxane wherein the average number of curing reaction functional groups in a molecule is greater than 1;

(B) an organopolysiloxane resin; and (C) a curing agent is particularly preferred. Here the silicone pressure-sensitive adhesive agent layer according the present invention has a function as a pressure-sensitive adhesive agent layer, where, insofar as it is a layer that is independent of the aforementioned (L1) high dielectric sheet layer, a high dielectric functional group, typified by a fluoroalkyl group that includes a 3,3,3-trifluoropropyl group, may be included, and is preferred.

There is no limitation on the system for curing the curable silicone composition, and that which is publicly known may be used. For example, it may be that which is peroxide curable that is cured with peroxide, that which is hydrosilylation reaction curable that is cured through a platinum catalyst, that which is energy beam curable/optically curable that is cured through exposure to an energy beam such as ultraviolet radiation, or that which is condensation reaction curable. Normally peroxide curable silicone compositions include diorganopolysiloxanes that include alkyl groups, and are cured through the effects of peroxide at a high temperature. The hydrosilylation reaction curable silicone compositions normally are cured through the hydrosilylation reaction between the vinyl group in a diorganopolysiloxane and an SiH group (a hydrogen atom bonded to a silicon atom) in an organohydrodiene polysiloxane, through the effect of a platinum catalyst. In energy beam curable/optically curable silicone compositions that are cured through a radical reaction in the presence of an optical polymerization initiator, that which is well known as a compound that produces radicals through exposure to an energy beam, such as ultraviolet radiation, or the like is, for example, organic peroxides, carbonyl compounds, organic sulfur compounds, azo compounds, and the like. Normally a condensation reaction curable silicone composition is cured through a condensation reaction between a silanol group, such as diorganopolysiloxane, and a hydrolyzable group, through the effect of a condensation reaction catalyst. The use of a hydrosilylation reaction curable silicone composition that is cured through a hydrosilylation reaction is preferred, in particular, due to the ability to cure in a short time at a relatively low temperature.

When a hydrosilylation reaction curable material is used for the curable silicone composition, the (A) curing reaction functional group of the organopolysiloxane is an alkynyl group, and, in particular, an alkynyl group with a carbon number between 2 and 10. The alkynyl group with a carbon number between 2 and 10 may be, for example, a vinyl group, an allyl group, a butenyl group, or a hexenyl group. Preferably the alkynyl group with a carbon number between 2 and 10 is a vinyl group. The (A) organopolysiloxane may include only a single component, or may be a mixture of two or more different components. A functional group other than an alkynyl group in the (A) component may be, for example, an alkyl group with a carbon number between 1 and 10 or an aryl group with a carbon number between 6 and 10, that has been modified with a halogen atom, such as a fluorine atom, or the like, and preferably is an alkyl group or a phenyl group with a carbon number between 1 and 6. Moreover, a fluoroalkyl group, such as a 3,3,3-trifluoropropyl group, may be included in the (A) component, and is preferred.

Preferably the (A) organopolysiloxane is of a straight-chain type. The room temperature characteristics of the (A) component may be oily or of a raw rubber type, and preferably the viscosity of the (A) component at 25° C. is no less than 50 mPa·s, and, in particular, preferably is no less than 100 mPa·s. In particular, when the curable silicone composition is of a solvent type, the (A) has a viscosity at 25° C. of no less than 100,000 mPa·s, or has a plasticity, measured based on the method stipulated in JIS K6249 (the value when a 1-kgf load is applied for three minutes to a 4.2-g spherical sample at 25° C.) is in a range between 50 and 200, and, more preferably, is an organopolysiloxane that includes an alkynyl group of a raw rubber type with a pliability in a range of between 80 and 180. However, an (A) component with a lower viscosity may also be used.

The (B) organopolysiloxane resin is a component that applies adhesive strength to the hard layer, and there is no particular limitation thereon insofar as it is an organopolysiloxane that has a three-dimensional network structure. For example, it may be a resin that is made from $R_2SiO_{2/2}$ units (D units) and $RSiO_{3/2}$ units (T units) (where, in this formula, R indicates mutually independent monovalent organic groups and may or may not include a hydroxyl group or a hydrolyzable group), or a resin made from T units alone that have hydroxyl groups or hydrolyzable groups, or may be a resin made from $R_3SiO_{1/2}$ units (M units) and $SiO_{4/2}$ units (Q units), and may or may not have hydroxyl groups or hydrolyzable groups. In particular, the use of a resin (known as an MQ resin) made from $R_3SiO_{1/2}$ units (M units) and $SiO_{4/2}$ units (Q units) that may or may not have hydroxyl groups or hydrolyzable groups, is preferred. Note that hydroxyl groups and hydrolyzable groups are groups that are produced as the result of a derivative of silane, as a raw material, or hydrolysis of silane, through direct bonding of T units or Q units within the resin directly to silicon.

The monovalent organic group of R is preferably a monofunctional hydrocarbon group with a carbon number between 1 and 10, and may be, for example, an alkynyl group with a carbon number between 2 and 10, an aryl group with a carbon number between 6 and 10, a cycloalkyl group with a carbon number between 6 and 10, a benzyl group, a phenylethyl group, a phenylpropyl group, or an alkyl group with a carbon number between 1 and 10, which may be modified with a halogen atom, such as a fluorine atom. In particular, preferably at least 90 mol % of R is an alkyl group or a phenyl group with a carbon number between 1 and 6, and, particularly preferably, between 95 and 100 mol % of R is methyl groups. Moreover, a portion of R may include fluoroalkyl groups, such as 3,3,3-trifluoropropyl ethyl groups, or the like, and this is preferred.

Preferably the (B) organopolysiloxane resin has a mole ratio of M units to Q units of between 0.5 and 2.0 when it is a resin structured from $R_3SiO_{1/2}$ units (M units) and $RSiO_{3/2}$ units (T units) and $SiO_{4/2}$ units (Q units). This is because if the mole ratio were less than 0.5, the adhesive strength to a hard layer would be reduced, and if greater than 2.0, the cohesive strength of the substance that structures an intermediate layer would be reduced. Moreover, D units and QT units may also be included in the (B) component in a range wherein there is no adverse effect on the characteristics of the present invention, and two or more types of organopolysiloxanes may be used in parallel in the (B) component. The organic polysiloxane may have a prescribed amount of hydroxyl groups or hydrolyzable groups, and may be a resin with hydroxyl groups or hydrolyzable groups, a resin without hydroxyl groups or hydrolyzable groups, or a mixture thereof, without any particular limitation. The organopolysiloxane resin, if it has hydroxyl groups or hydrolyzable groups, normally includes hydroxyl groups or hydrolyzable groups at between 0.1 and 5.0 mass %.

When a hydrosilylation reaction curable material is used for the curable silicone composition, preferably the (C) is an organohydrodiene polysiloxane having at least two Si—H bonds in the molecule. In this case, the alkynyl groups of the organopolysiloxane undergo hydrosilylation with the hydrogen atoms that are bonded to the silicon atoms in the organohydrodiene polysiloxane, to form the cured material of the curable silicone composition. The (C) curing agent may include only a single component, or may be a mixture of two or more different components.

When that which is hydrosilylation reaction curable is used for the curable silicone composition, the inclusion proportion of the (C) curing agent preferably is in a mole ratio in a range of between 0.1 and 100, and more preferably between 0.2 and 50, for the silicon atom-bonded hydrogen atom (SiH) group in the (C) component in respect to the alkyl groups in the composition. This is because if the mole ratio were in excess of 100, then the amount of curing agent that would remain without reacting would be too great, and if the mole ratio were less than 0.1, then the curing would be inadequate.

Moreover, if that which is hydrosilylation reaction curable is used for the curable silicone composition, a (D) hydrosilylation reaction catalyst may be included as another component. The hydrosilylation reaction catalyst may be, for example, a platinum catalyst, a rhodium catalyst, or a palladium catalyst, where a platinum catalyst is preferred due to its ability to promote curing of the composition remarkably. The platinum catalyst may be a platinum ultrapowder, chloroplatanic acid, an alcohol solution of chloroplatanic acid, a platinum-alkenyl siloxane complex, a platinum-olefin complex, or a platinum-carbonyl complex, where a platinum-alkenyl siloxane complex is particularly preferred. The alkenyl siloxane may be selected from 1,3-di-vinyl-1,1,3,3-tetramethyl disiloxane, 1,3,5,7-tetramethyl-1,3,5,7-tetravinyl chloro tetrasiloxane, alkynyl siloxanes wherein a portion of the methyl groups of these alkenyl siloxanes have been replaced with ethyl groups, phenyl groups, or the like, or groups selected from a set comprising nitriles, amides, dioxylanes, and sulfolanes, or alkenyl siloxanes wherein the vinyl groups in the alkynyl siloxanes have been replaced with allyl groups, hexenyl groups, or the like. In particular, given the good stability of platinum-alkenyl siloxane complexes, 1,3-divinyl-1,1,3,3-tetramethyl disiloxane is preferred. Note that non-platinum metal catalysts, such as iron, ruthenium, iron/cobalt, and the like, may be used instead as the catalyst for promoting the hydrosilylation reaction.

The inclusion proportion of the (D) hydrosilylation relation reaction catalyst is with the amount of platinum metal in the range of between 1 and 5000 ppm, in respect to the total amount of components (A) through (C), where a range of 1 through 1000 ppm is preferred, and a range of 1 through 200 ppm is more preferred. This is because if the inclusion proportion of the (D) hydrosilylation relation reaction catalyst were less than 1 ppm, the curing rate would be slow, or the curing would be inadequate, and if in excess of 5000 ppm, this would produce problems with discoloration, and the like.

Components other than the components listed above may be included in the curable silicone composition in a range wherein the characteristics thereof are not lost. For example, curing retardation agents; adhesion promoting agents; non-reaction organopolysiloxanes, such as polydimethyl siloxane or polydimethyldiphenyl siloxane; oxide inhibitors such as those that are phenol-based, quinone-based, amine-based, phosphor-based, phosphide-based, sulfur-based, thio-ether-based, and the like; optical stabilizing agents such as those that are triazole-based, benzophenone-based, and the like; flame retarding agents such as those that are phosphoric acid ester-based, halogen-based, phosphor-based, antimony-based, and the like; one or more types of antistatic agents made from cationic surface activating agents, anionic surface activating agents, non-ionic surface activating agents, and the like; dyes; pigments; and so forth may be included.

The silicone-based pressure-sensitive adhesive agent layer according to the present invention may be obtained through forming a coating film, through coating onto a high dielectric sheet, or onto a layered structural unit including the same, and then forming into a cured material under desired conditions, or the curable silicone composition described above may be coated onto another releasable substrate and then cured, and the cured material may be peeled from the releasable substrate and applied to the high dielectric sheet or onto the layered structural unit including the same.

The method for coating may be gravure coating, offset coating, offset gravure, roller coating, reverse-roller coating, air knife coating, curtain coating, and comma coating.

While the curing reaction will differ depending on the curing system, in the case of that which is hydrosilylation relation reaction curable, curing is achieved through heating the composition or exposing it to an activation energy beam. While there is no particular limitation on the temperature for the curing reaction through heating, between 50° C. and 200° C. is preferred, and between 60° C. and 200° C. is more preferred, and between 80° C. and 180° C. is even more preferred. Moreover, while the time for the curing reaction is dependent on the structures of the (A), (B) and (C) components, described above, normally it is between one second and three hours. Generally the cured material can be produced through holding for between 10 seconds and 30 minutes in a range of between 90 and 180° C.

[(L3) Electrode Layer]

The electrode layer is an electrode layer or electrically conductive layer that is provided on the high dielectric sheet, or the layered structural unit including the high dielectric sheet, described above, for the purpose of applying power. Specifically, the electrode layer is that which forms a single electrode, or a plurality thereof, on the dielectric sheet, described above, the pressure-sensitive adhesive agent layer, the thermoplastic resin layer, or the like, where the electrode is an electrically conductive film or a conductor. This electrode layer may be a transparent electrode layer or may be opaque. The methods for forming these electrode layers are publicly known, where a conductor may be formed through a method of coating an ink into which has been dispersed conductive particles selected from a group comprising Au, Ag, Cu, C, ZnO, and $In_2O_3$, and the like. In this case, preferably a paste wherein these conductive particles, a binder resin, and an organic solvent are mixed and dispersed (termed also a "conductive pace") is coated and printed. This enables the binder resin to satisfy the function of a binding agent for binding together the conductive particles, improving the final durability of the electrode layer. The binder resin may be, for example, an ethyl cellulose-based resin, an acrylic resin, or the like. The organic solvent may be, for example, terpineol, butyl carbitol acetate, or the like.

, depending on the application of this layered body, the electrode layer may be a transparent electrode layer, which is preferred. The transparent electrically conductive film may be structured from, for example, ITO (indium oxide+tin oxide), CNT (carbon nanotubes), IZO (indium oxide+zinc oxide), AZO (Al-doped zinc oxide), a conductive polymer (PEDOT or PSS), or the like. The conductor may be, for example, a photosensitive silver cup, silver nanoink, silver nanowires, vapor-deposited copper, rolled copper, copper nanoink, or the like. In particular, when the layered body is used as a member for an electronic device that is to be used in a display device application, such as for a touch panel, the use of a transparent electrically conductive film, such as ITO, enables the layered body as a whole to be designed to be substantially transparent.

There is no particular limitation on the shape or placement of the electrode layer, and, as illustrated in FIG. 5 of the present invention, a plurality of electrodes may be provided in the same electrode layer plane. Rather, as illustrated in FIG. 6 of the present invention, electrode layers may be disposed at mutually differing angles.

[(L4) Non-Silicone-Based Thermoplastic Resin Layer]

The non-silicone-based thermoplastic resin layer is a sheet-shaped layer made from a thermoplastic resin other than silicone, and may be a supporting layer or reinforcing layer for increasing the physical strength of the various layers described above. While the use of such a thermoplastic resin layer in the present invention is arbitrary, it is possible to improve the ease of handling, when handling the layered body itself as an electronic device member, through physical reinforcement of the entirety of the layered body that includes the high dielectric sheet, through the use of, for example, a structure wherein the high dielectric sheet, or a layered structural unit including the high dielectric sheet, has a supporting layer on one face thereof, or is held between supporting layers on both faces thereof.

The substrate used for the thermoplastic resin layer may be, for example, polyimide, polyethylene, polypropylene, polystyrene, polyvinyl chloride, polyvinylidene chloride, polycarbonate, polyethylene terephthalate (PET), nylon, a cycloolefin polymer, or polymethyl methacrylate. In particular, when thermal durability is required in the layered body as a whole, a thermally durable synthetic resin film such as of polyimide, polyether ether ketone, polyethylene naphthalate (PEN), liquid crystal polyarylate, polyamide imide, polyether sulfone, and the like, are suitable. On the other hand, when the layered body is to be used in a device that requires visual clarity, such as in a display device, a transparent substrate, specifically a transparent material such as polypropylene, polystyrene, polyvinylidene chloride, polycarbonate, polyethylene terephthalate (PET), PEN, or the like, is suitable.

Preferably the thermoplastic resin layer is in the form of a film or a sheet. While there is no particular limitation on the thickness thereof, normally it is between about 5 and 300 μm. Moreover, a thermoplastic resin film or thermoplastic resin sheet that has been treated with a primer process, corona process, etching process, or plasma process may be used in order to improve the adhesion between the thermoplastic resin layer and another functional layer in the layered body. Additionally, a protective layer may be formed or a surface treatment may be performed on the thermoplastic resin, such as a process to prevent scratches, to prevent soiling, to prevent adherence of fingerprints, to prevent glare, to prevent reflections, to prevent static, or the like.

[Other Functional Layers]

The layered body according to the present invention may have other functional layers in addition to the various layers described above, and there is no limitation on the thickness or type of these functional layers insofar as they technically do not interfere with curing in the present invention. Specifically, the other functional layers may be protective layers, non-silicone adhesive layers, optical functional layers such as reflecting layers, and the like, and these layers, as desired, may be placed between layers (that is, as intermediate layers), or as outer layers.

[Placement of Each Layer in the Layered Body]

The placement of the various layers, described above, in the layered body according to the present invention is arbitrary, and can be designed depending on the durability and strength, and ease of handling as an electronic device member, required for the layered body. On the other hand, the high dielectric sheet described above may be used as an electrical or electronic component, or as a dielectric layer in a transducer or display device, and can be placed through adhesion of the layered body as a whole to the device, and from the perspective of use as an intermediate layer for improving interlayer adhesion with other functional layers that structure the layered body, a structure is preferred wherein the (L1) single layer or multiple layers of the high dielectric sheet that includes the polymer cured material that has the dielectric functional group, or the layered structural unit that includes the polymer cured material, is held between at least two (L2) pressure-sensitive adhesive layers.

Moreover, the layered body according to the present invention preferably has an (L3) electrode layer and/or a (L4) non-silicone thermoplastic resin layer on at least one face of the (L1) single-layer or multilayer high dielectric sheet that includes the polymer cured material that includes the dielectric functional group, and may further have a (L2) pressure-sensitive adhesive layer, (L3) electrode layer, or (L4) non-silicone thermoplastic resin layer as a layer that is further on the outside than these functional layers, when viewed from the high dielectric sheet.

Similarly, the layered body according to the present invention may have at least (L1) a single-layer or multilayer high dielectric sheet that has a polymer cured material that has a dielectric functional group, and at least one layer selected from (L3) electrode layers and (L4) non-silicone thermoplastic resin layers on at least one face of a (L2) pressure-sensitive adhesive layer.

Note that in the layered body according to the present invention, a functional layer of a given category may be a single layer or multiple layers, and, as explained for the high dielectric sheet, may be a single sheet or a compound sheet. For example, in the (L4) non-silicone thermoplastic resin sheet, single synthetic resin sheets and compound sheets wherein two different types of synthetic resin sheets are adhered together are included in the scope of the present invention.

When used as an electronic device member, the structure of this type of layered body made be a combination such as described below. Note that the combinations below are examples, and, of course, the combinations are not limited thereto, and need not be layered bodies that have symmetry, as depicted in some of the examples. Moreover, in the examples, the examples of the individual functional layers are as below, where "/" means that the individual layers are facing in the layering direction of the layered body (typically the direction of thickness that is perpendicular to the surface of each of the functional layers):

(L1) a single-layer or a multilayer high dielectric sheet including a polymer cured material having a dielectric functional group: (EAP)

(L2) Pressure-sensitive adhesive layer: (PSA)

(L3) Electrode layer: (EL)

(L4) Non-silicone thermoplastic resin layer (PF)

Example 1: PSA/EAP/PSA

Example 2: PSA/EL/EAP/EL/PSA

Example 3: PSA/PF/EAP/PF/PSA

Example 4: PSA/EL/PF/EAP/PF/EL/PSA

Example 5: PSA/PF/EL/EAP/EL/PF/PSA

Example 6: PF/PSA/EL/EAP/EL/PSA/PF

Example 7: EL/PSA/EAP/PSA/EL

Example 8: PF/PSA/EL/EAP/PF/PSA/EL

Example 9: EL/PSA/EAP/EL

Example 10: EL/PSA/EAP/EL/PSA

Example 11: PF/PSA/EAP/PF

Example 12: PF/PSA/EAP/PF/PSA

Example 13: EL/PSA/PF/EAP/PF/PSA/EL

Example 14: PSA/EL/PF/EAP/PF/EL/PF

Note that for the layered bodies wherein electrode layers are formed on the PSA, such as Example 7, Example 13, and the like, the electrode layer may be provided on the PSA through shipping in a state wherein a releasable layered body that includes the separator on the PSA, as described below, followed by peeling the separator and applying the electrode layer to the PSA. Note that when mounting in a layered display device, such as a touch panel, the display surface, such as a glass substrate, and the transparent electrode substrate, such as ITO, or the like, and the display module may be joined together through a PSA layer.

[Releasable Layered Body]

The layered body according to the present invention may be a releasable layered body that further includes a (L5) separator that is provided with a releasable surface opposite the (L2) pressure-sensitive adhesive layer. The use of a separator having a release surface that faces the pressure-sensitive adhesive layer enables the layered structure according to the present invention, which includes the dielectric sheet, to be handled through easy removal from the separator that structures the layered body, and enables the layered structure to be bonded to the device using the pressure-sensitive adhesive layer that is exposed when the separator is removed. This layered body has the (L5) separator that is provided with the release surface that faces the pressure-sensitive adhesive layer, and, as appropriate, may be provided with another (L5) separator as well, where the structure of the layered body may be as follows. Note that, in the examples below, "/" means that the individual layers are facing in the layering direction of the layered body (typically the direction of thickness that is perpendicular to the surface of each of the functional layers). Moreover, in the separator, the substrate and the release surface may be integrated together, or may be the same layer (where the substrate is given releaseability through the provision of a material or through physical texturing).

Example 1: Separator/release surface/(L2) pressure-sensitive adhesive layer/(L1) dielectric sheet or layered structure that includes a dielectric sheet Example 2: Separator/release surface/(L2) pressure-sensitive adhesive layer/(L1) dielectric sheet or layered structure including dielectric sheet/(L2) pressure-sensitive adhesive layer/release surface/separator.

In particular, when there is a configuration wherein, as in Example 2, the dielectric sheet or layered structure including a dielectric sheet according to the present invention is layered between two release surfaces, a layered body that includes a dielectric sheet, according to the present invention, can be transported (even exporting to a foreign country) in a state wherein it is protected by a separator, where the separators that are provided with the release surfaces are removed from both faces of the layered body at a desired location at a desired time, enabling the layered body that includes the dielectric sheet, according to the present invention, to be placed and layered on a desired device using the pressure-sensitive adhesive layer.

Moreover, as desired, the entire layered body, including the dielectric sheet according to the present invention, may be subjected to a rolling process through rolling with rollers, or the like, in a state wherein it is held between separators, followed by curing, through heating or the like, the various flattened functional layers, or a curable composition for forming the (L1) dielectric sheet or (L2) pressure-sensitive adhesive layer, to produce a layered body that includes a dielectric sheet according to the present invention.

There is no particular limitation on the substrate of the separator described above, and it may be, for example, cardboard, corrugated paper, clay-coated paper, or polyolefin laminated paper, and, in particular, may be polyethylene-laminated paper, a synthetic resin film or sheet, a natural fiber fabric, a synthetic fiber fabric, an artificial leather fabric, or a metal film. In particular, a synthetic resin film or sheet is preferred, where the synthetic resin may be, for example, polyimide, polyethylene, polypropylene, polystyrene, polyvinyl chloride, polyvinylidene chloride, polycarbonate, polyethylene terephthalate, polycycloolefin, or nylon. Preferably the substrate is in the form of a film or a sheet. There is no particular limitation on the thickness thereof, which may be designed at a desired thickness depending on the application. Note that, as described below, the substrate itself may be a material so as to function as the release layer, or may be a structure that is given releaseability through the formation of fine texturing physically on the substrate of the surface.

The release surface may also be termed a "release liner," a "release layer," or a "release coating layer," and suitably may be a release layer that has a release coating such as a silicon release coating, a fluorine release coating, an alkyd release coating, a fluorosilicone release coating, or the like, or fine texturing may be formed physically on the substrate surface, or it may be the substrate itself that is resistant to adhesion to the pressure-sensitive adhesive layer described above.

[Application of the Layered Body]

The layered body that includes the dielectric sheet according to the present invention may be used independently as a dielectric layer in a film capacitor, or the like, but is particularly well-suited as an electrical or electronic component, or as an electronic device member used in a transducer or a display device. Specifically, the layered body according the present invention is useful as an electronic material or as a member for a display device or a member for a transducer (including use for sensors, speakers, actuators, and generators), and, in particular, a layered body that is, overall, transparent is suitable as a member for a display panel or a display, and is beneficial in devices, and particularly in so-called touch panel applications that can operate electronic devices through contacting a screen with a fingertip, or the like, and in various types of transducer applications.

[Method for Manufacturing an Electronic Device]

The layered body that includes a dielectric sheet according the present invention can be used as an electronic device member, and, specifically, provides a method for manufacturing an electrical or electronic component, or a transducer or display device, having a step for placing the layered body within the device.

Similarly, it can provide a method for manufacturing an electrical or electronic component, or a transducer or display device, having, for a releasable layered body that has a separator:

(I) a step for removing a (L5) separator from the releasable layered body, and (II) a step for disposing a layered body that has, on its outer layer, the pressure-sensitive adhesive layer, obtained in Step (I), above, into the device.

The layered body set forth above may be placed as a single unit into the device, or a plurality of identical or different layered bodies may be placed into the device. When a plurality of layered bodies are placed into the device, they may be placed at functional portion positions that are different in the plane of the device or that are horizontal, or essentially horizontal, thereto, or, in order to secure the thickness of the layered body, a plurality may be disposed stacked in the direction that is perpendicular to the surface of the functional layer. In particular, the latter layering method is a method for placement that is beneficial in a transducer device that requires a large electrostatic capacitance. Moreover, the layered body may be placed through a slot-in method at placement positions for members that are provided in a direction that is perpendicular in respect to the device surface, depending on the type of device and the placement of the dielectric layer.

INDUSTRIAL APPLICABILITY

There are no constraints whatsoever, other than those described above, in regard to the application of the layered body that includes the dielectric sheet according the present invention, and it may be used in various types of transducers for speakers, actuators, generators, and the like, in television receivers, computer monitors, mobile information terminal monitors, monitors for monitoring, in displays for a variety of instruments such as video cameras, digital cameras, mobile telephones, mobile information terminals, automobiles, and the like, in displays for instruments of a variety of equipment, apparatuses, and devices, and in a variety of flat-panel displays (FPDs) for displaying text, symbols, and images, such as in automatic ticket vending machines, automatic teller machines, and the like. As devices, the application may be in CRT displays, liquid crystal displays, plasma displays, organic EL displays, inorganic EL displays, LED displays, surface electrolytic displays (SEDs), electric field emission-type displays (FEDs), and other display devices, and it may be applied to touch panels used therein.

EMBODIMENTS

While the present invention will be explained using examples of configurations thereof and raw materials, and the like, for forming the individual functional layers, the present invention is not limited thereby.

[Raw Material Components for a Curable Organopolysiloxane Composition for Forming a Dielectric Sheet]

Component (a1): 3,3,3-trifluoropropyl methyl siloxane-dimethyl siloxane copolymer with vinyl dimethyl siloxane groups blocked at both ends (3,3,3-trifluoropropyl methyl siloxane units: 182, dimethyl siloxane units: 46, proportion of inclusion of fluoroalkyl groups: 39 mol %). Viscosity, measured with an E-type viscometer at 25°, is approximately 10,000 mPa·s.

Component (a2): 3,3,3-trifluoropropyl methyl-dimethyl siloxane copolymer with vinyl dimethyl siloxane groups blocked at both ends (siloxane polymerization: 273, 3,3,3-trifluoropropyl methyl siloxane units: 216, dimethyl siloxane units: 57, proportion of inclusion of fluoroalkyl groups: 40 mol %). Viscosity, measured with an E-type viscometer at 25°, is approximately 17,500 mPa·s.

Component (B1): $M^H_{1.3}T^{F3Pr}$ (Mw=1.11×10³) structured from dimethyl hydrosiloxy units and T units that have 3,3,3-trifluoropropyl groups. Note that the weight-average molecular weight of the component (B1) is a weight-average molecular weight of the calculated equivalent of polystyrene, measured through GPC (gel permeation chromatography) using a tetrahydrofuran (THF) solvent.

Component (C1): Platinum-3,3,3-trifluoromethyl siloxane complex, blocked with dimethylvinyl siloxane groups at both ends (siloxane polymerization: 3, about 0.5% by weight by platinum density).

<Hydrosilylation Reaction Suppressing Agent>

Component (D1): 3-methyl-1-butyne-3-ol

The relative dielectric constants and dynamic viscoelasticity (=shear storage modulus) of the dielectric sheets of Composition Example 1 and Composition Example 2 were measured through the method described below.

<Measurement of Relative Dielectric Constant>

The relative dielectric constant was measured using an LCR6530P, manufactured by Wayne Kerr. The measurement was performed using a sample wherein a film with a thickness of between about 1.5 and 2.0 mm was cured on a substrate film PET.

<Measurement of Dynamic Viscoelasticity>

An MCR302, manufactured by Anton Paar, was used in measuring the dynamic viscoelasticity. Disk-shaped samples with a thickness of approximately 1.5 mm and a diameter of 8 mm were manufactured, and a parallel plate method was used to measure through heating at a rate of 3°/min from −80° C. through 150° C. At this time the shear storage modulus at 23° C. was used, under conditions of a frequency of 1 Hz and deformation of 0.2%.

Composition Example 1: Curable Organopolysiloxane Composition 1 for Providing a Dielectric Sheet A curable organopolysiloxane composition including 99.08 parts by weight of Component (a1), 0.77 parts by weight of Component (B1), 0.07 parts by weight of Component (C1), and 0.08 parts by weight of Component (D1), described above, was prepared. The silicon atom-bonded hydrogen atoms (Si—H) were in an amount of about 0.7 mole per mole of vinyl groups in the composition. This composition was coated in the form of a film, and was cured through heating for 15 minutes at 80° C., followed by heating another 15 minutes at 150° C., to produce a gel-type dielectric sheet (organopolysiloxane cured material).

The shear storage modulus measured through the method described above was 4.2×10³ Pa. Note that the value for the relative dielectric constant of the dielectric sheet, at room temperature and the frequency of 1 kHz, was 6.

Composition Example 2: Curable Organopolysiloxane Composition 2 for Providing a Dielectric Sheet A curable organopolysiloxane composition including 99.37 parts by weight of Component (a2), 0.56 parts by weight of Component (B1), and 0.08 parts by weight of Component (C1), described above, was prepared. The silicon atom-bonded hydrogen atoms (Si—H) were in an amount of about 0.6 mole per mole of vinyl groups in the composition. This composition was coated in the form of a film, and was cured through heating for 10 minutes at 110° C. to produce a gel-type dielectric sheet (organopolysiloxane cured material).

The shear storage modulus measured through the method described above was 1.6×10⁴ Pa. Note that the value for the relative dielectric constant of the cured material, at room temperature and the frequency of 1 kHz, was 6.

Component A1 Through A10: MTQ Resin Including 3,3,3-Trifluoropropyl Groups

Table 1 shows the inclusion proportions in the structures of the siloxane units of the MTQ-type silicone resins that include 3,3,3-trifluoropropyl groups in composition examples 3 through 19 (component proportions of $(CH_3)_3SiO_{1/2}$ units: M units, trifluoropropyl-$SiO_{3/2}$ units: $T^{Tfp}$ units, and $SiO_{4/2}$ units: Q units), weight average molecular weights, and inclusion proportions of trifluoropropyl groups (equal=fluoroalkyl groups):

TABLE 1

| Component | A1 | A2 | A3 | A4 | A5 |
|---|---|---|---|---|---|
| M Units | 0.13 | 0.05 | 0.14 | 0.13 | 0.10 |
| $T^{Tfp}$ Units | 0.78 | 0.73 | 0.55 | 0.66 | 0.69 |
| Q Units | 0.09 | 0.22 | 0.31 | 0.21 | 0.21 |
| Weight-Average Molecular Weight | 1.85 × 10³ | 1.09 × 10³ | 1.09 × 10³ | 1.88 × 10³ | 1.52 × 10³ |
| Proportion of Trifluoropropyl groups* (mol %) | 67% | 83% | 57% | 63% | 70% |
| Component | A6 | A7 | A8 | A9 | A10 |
| M Units | 0.13 | 0.35 | 0.21 | 0.14 | 0.13 |
| $T^{Tfp}$ Units | 0.54 | 0.19 | 0.68 | 0.74 | 0.66 |

TABLE 1-continued

| | | | | | |
|---|---|---|---|---|---|
| Q Units | 0.33 | 0.46 | 0.11 | 0.12 | 0.21 |
| Weight-Average Molecular Weight | $3.82 \times 10^3$ | $3.60 \times 10^3$ | $6.90 \times 10^2$ | $2.17 \times 10^3$ | $3.09 \times 10^3$ |
| Proportion of Trifluoropropyl groups* (mol %) | 58% | 15% | 52% | 64% | 63% |

[Raw Material Components of the Curable Organopolysiloxane Composition that is a Dielectric Sheet that Functions Also as a Transparent Silicone Pressure-Sensitive Adhesive Agent Layer (OCA Layer)]

Along with the components A1 through A10, above, the following components were used as raw material components of the curable organopolysiloxane composition that is a dielectric sheet and that provides the transparent silicone pressure-sensitive adhesive agent layer (OCA layer):

Component (a3): 3,3,3-trifluoropropyl methyl siloxane polymer with vinyl dimethyl siloxane groups blocked at both ends (siloxane polymerization: 250, proportion of inclusion of fluoroalkyl groups: 49 mol %)

Component (a4): 3,3,3-trifluoropropyl methyl-dimethyl siloxane copolymer with vinyl dimethyl siloxane groups blocked at both ends (siloxane polymerization: 390, proportion of inclusion of fluoroalkyl groups: 20 mol %)

Component (B2): $M^H{}_{17}Q$ (Mw=$1.00 \times 10^3$)

Component (B3): $M^H D^{Tfp}{}_{13} M^H$ (silicon atom-bound hydrogen atom 0.092% by weight)

In this formula, $M^H$ represents a $(CH_3)_2(H)SiO_{1/2}$ group, $D^{Tfp}$ represents a (3,3,3-triflouropropyl) methyl $SiO_{2/2}$ group, and Q represents a $SiO_{4/2}$ group.

Component (C2): platinum-divinyl tetramethyl disiloxane complex (0.6% by weight, in terms of platinum concentration)

Component (D2): 1,3,5,7-tetramethyl-1,3,5,7 tetravinyl cyclotetrasiloxane

Component (E): 1,3-bis (trifluoromethyl) benzene

Composition Example 3: Curable Organopolysiloxane Composition 3 for Providing a Dielectric Sheet 40.94 parts by weight of component (A1) (with 58.49 parts by weight of a 70 mass % solution of (E) 1,3-bis (trifluoromethyl) benzene), 17.54 parts by weight of component (E), 40.88 parts by weight of component (a3), 0.53 parts by weight of component (B1), 0.06 parts by weight of component (C2), and 0.06 parts by weight of component (D2) were mixed in a glass vial, to manufacture the curable organopolysiloxane composition of Composition Example 3.

Composition Examples 4 Through 19: Curable Organopolysiloxane Compositions 4 Through 19

The curable organopolysiloxane compositions that are Composition Examples 4 through 19 were manufactured with the components in compositions shown in Table 2 and Table 3, in the same manner as with Composition Example 3.

The relative dielectric constant, dynamic viscoelasticity (=shear storage modulus), optical transparency, and adhesive strength were measured, using the methods described below, for the organopolysiloxane cured materials (=silicone pressure-sensitive adhesive agent layers that are dielectric) of Composition Examples 3 through 19. That is, the organopolysiloxane cured materials of Composition Examples 3 through 19 can be used as the dielectric sheet according to the present invention, while also being components that can function also as transparent silicone pressure-sensitive adhesive agent layers.

<Measurement of the Relative Dielectric Constant>

For the organopolysiloxane cured materials of Composition Examples 3 through 19, the relative dielectric constants were measured using an LCR6530P, manufactured by Wayne Kerr. The measurements were performed on film-shaped samples of approximately 1.0 mm that were allowed to rest overnight at room temperature followed by curing for 15 minutes at 150° C.

<Measurement of Dynamic Viscoelasticity>

For the organopolysiloxane cured materials of Composition Examples 3, 6, 8, 10 through 14, 18, and 19, an MCR301, manufactured by Anton Paar, was used for measuring the dynamic viscoelasticity. The curable organopolysiloxane composition for each composition example was allowed to rest overnight at room temperature, followed by curing for 15 minutes at 150° C. Thereafter, a disk-shaped sample with a thickness of approximately 1 mm and a diameter of 8 mm was manufactured, and a parallel plate method was used to perform the measurement at a deformation of 0.1% and frequency of 1 Hz, with a speed of 3° C./min from −60° C. to 150° C.

<Measurement of Optical Transparency>

For the organopolysiloxane cured materials of Composition Examples 3 through 19, a spectrophotometer CM-5, manufactured by Konica Minolta, was used to measure the total optical transparency.

The curable organopolysiloxane composition for each composition example was coated onto polyethylene terephthalate (PET, with a thickness of 50 µm) so as to have a thickness of approximately 300 µm after curing. The samples were allowed to rest overnight at room temperature, followed by curing for 15 minutes at 150° C., and the film-shaped samples produced were provided for measurement. The total optical transparencies for the organopolysiloxane cured materials according to the composition examples listed above were 89% (for all), and, in consideration of the total optical transparency of the PET film that was used, the organopolysiloxane cured materials obtained through Composition Examples 3 through 19 were fully usable in cases wherein transparency is required.

<Measurement of Adhesive Strength>

For the organopolysiloxane cured materials according to Composition Examples 3 through 19, an automatic coating machine (PI-1210, manufactured by Tester Sangyo Co.) was used to coat the curable organopolysiloxane composition according to each composition example onto a PET substrate (thickness of 50 µm) so as to have a thickness of approximately 100 µm after curing. The samples were allowed to rest for 60 minutes at 70° C., followed by curing for 15 minutes at 150° C. PET substrates (thickness of 50 µm) were adhered to the cured material films produced, to manufacture the test pieces. The measurements of the stripping force were performed through peeling at 180° with a speed of 300 mm/m in a 23° C., 50% humidity environment (RTC-1210, manufactured by Orientec Company).

TABLE 2

| Composition Example | 3 | 4 | 5 | 6 | 7 | 8 | 9 | 10 | 11 | 12 |
|---|---|---|---|---|---|---|---|---|---|---|
| Component (A1) | 40.94 | 40.96 | 40.96 | | | | | | | |
| Component (A2) | | | | 40.96 | | | | | | |
| Component (A3) | | | | | 40.96 | | | 40.94 | | |
| Component (A4) | | | | | | 40.96 | | | 40.94 | |
| Component (A5) | | | | | | | 40.96 | | | 40.94 |
| Component (A6) | | | | | | | | | | |
| Component (A7) | | | | | | | | | | |
| Component (A8) | | | | | | | | | | |
| Component (a3) | 40.88 | 40.72 | 40.55 | 40.72 | 40.72 | 40.71 | 40.72 | 40.88 | 40.88 | 40.88 |
| Component (B1) | 0.53 | 0.65 | 0.83 | 0.65 | 0.65 | 0.66 | 0.65 | 0.53 | 0.53 | 0.53 |
| Component (B2) | | | | | | | | | | |
| Component (C2) | 0.06 | 0.06 | 0.06 | 0.06 | 0.06 | 0.05 | 0.06 | 0.06 | 0.06 | 0.06 |
| Component (D2) | 0.06 | 0.06 | 0.06 | 0.06 | 0.06 | 0.06 | 0.06 | 0.06 | 0.06 | 0.06 |
| Component (E) | 17.54 | 17.55 | 17.55 | 17.55 | 17.55 | 17.55 | 17.55 | 17.54 | 17.54 | 17.54 |
| SiH/Vi Ratio | 1.0 | 1.3 | 1.6 | 1.3 | 1.3 | 1.3 | 1.3 | 1.0 | 1.0 | 1.0 |
| 25° C. Storage Modulus G' (MPa) | 0.009 | — | — | 0.10 | 0.09 | — | — | 0.07 | 0.03 | 0.03 |
| Transparency (Visual) | Transparent | Transparent | Transparent | Transparent | Transparent | Transparent | Transparent | Transparent | Transparent | Transparent |
| Relative Dielectric Constant (1k Hz) | 5.7 | 5.7 | 5.7 | 6.2 | 5.2 | 5.8 | 5.9 | 5.2 | 5.6 | 5.6 |
| Adhesive Strength (N/m) | 67 | 128 | 110 | 598 | 539 | 284 | 358 | 529 | 162 | 319 |

TABLE 3

| Composition Example | 13 | 14 | 15 | 16 | 17 | 18 | 19 |
|---|---|---|---|---|---|---|---|
| Component (A1) | | | | | | | |
| Component (A2) | | | | | | | |
| Component (A3) | | | | | | | |
| Component (A4) | | | | | | | |
| Component (A5) | | | | | | | |
| Component (A6) | 40.96 | 40.94 | 40.96 | | | | |
| Component (A7) | | | | 40.95 | | | |
| Component (A8) | | | | | 44.44 | | |
| Component (A9) | | | | | | 42.86 | |
| Component (A10) | | | | | | | 42.86 |
| Component (a3) | 41.02 | 40.88 | 40.72 | | 43.64 | 40.73 | 40.73 |
| Component (a4) | | | | 41.04 | | | |

TABLE 3-continued

| Composition Example | 13 | 14 | 15 | 16 | 17 | 18 | 19 |
|---|---|---|---|---|---|---|---|
| Component (B1) | 0.36 | 0.53 | 0.65 | | 0.71 | 0.20 | 0.20 |
| Component (B2) | | | | 0.37 | | | |
| Component (B3) | | | | | | 1.81 | 1.81 |
| Component (C2) | 0.06 | 0.06 | 0.06 | 0.04 | 0.04 | 0.06 | 0.06 |
| Component (D2) | 0.06 | 0.06 | 0.06 | 0.04 | 0.04 | 0.05 | 0.05 |
| Component (E) | 17.55 | 17.54 | 17.55 | 17.55 | 11.12 | 14.29 | 14.29 |
| SiH/Vi Ratio | 0.7 | 1.0 | 1.3 | 1.3 | 1.3 | 1.0 | 1.0 |
| 25° C. Storage Modulus G' (MPa) | 0.08 | 0.06 | — | — | — | 0.016 | 0.034 |
| Transparency (Visual) | Transparent | Transparent | Transparent | Transparent | Transparent | Transparent | Transparent |
| Relative Dielectric Constant (1k Hz) | 5.2 | 5.0 | 5.2 | 3.7 | 5.3 | 5.4 | 5.6 |
| Adhesive Strength (N/m) | 677 | 628 | 657 | 71 | 33 | 163 | 279 |

Preparation Example 1: Silicone-Based Pressure-Sensitive Adhesive Agent Sheet Formed on a Separator A silicone pressure-sensitive adhesive agent composition SD4580 FC (manufactured by Toray Dow Corning Co., Ltd.) was coated to produce a thickness of 50 μm onto a PET film (separator) that was provided with a release layer, and cured through heating under conditions of 120° C. for five minutes, to produce a layered body wherein a silicone-based pressure-sensitive adhesive agent sheet was formed on a PET film (separator) that was provided with a release layer. Note that in the embodiments below, a pressure-sensitive adhesive agent composition other than the SD4580 FC, described below, may be used, and a separator substrate other than a PET film may be used.

Embodiment 1: Production of a Layered Body Equipped with a Structure Comprising Separator/Release Surface/(L2) Silicone-Based Pressure-Sensitive Adhesive Layer/(L1) Dielectric Sheet A layered body comprising a silicone-based pressure-sensitive adhesive agent sheet on the separator prepared in Adjustment Example 1 was adhered onto a gel-type high dielectric sheet, made from one organopolysiloxane cured material selected from Composition Example 1 or 2 so that the silicone-based pressure-sensitive adhesive agent sheet side faced the high dielectric sheet, to perform contact bonding. Thereafter, a layered body comprising a silicone-based pressure-sensitive adhesive agent sheet was adhered onto the separator prepared in Adjustment Example 1, for the other side of the high dielectric sheet, to perform contact bonding. Through this, a layered body was produced wherein silicone-based pressure-sensitive adhesive layers and separators were layered symmetrically onto both faces of a single-layer high dielectric sheet.

Embodiment 2: Production of a Layered Body Equipped with a Structure Comprising Separator/Release Surface/(L2) Silicone-Based Pressure-Sensitive Adhesive Layer/(L4) Non-Silicone Thermoplastic Resin Layer/(L1) Dielectric Sheet A PET film was adhered onto a gel-type high dielectric sheet, made from one organopolysiloxane cured material selected from Composition Example 1 or 2 so as to face the high dielectric sheet, to perform contact bonding. Thereafter, a layered body comprising a silicone-based pressure-sensitive adhesive agent sheet on the separator prepared in Adjustment Example 1 was adhered onto the PET film such that the silicone-based pressure-sensitive sheet side faced the PET film, to perform contact bonding. Another layered body, wherein a PET film, a silicone-based pressure-sensitive adhesive agent sheet, and a separator were layered onto a dielectric sheet, was also produced, using the same method.

The two sets of layered bodies, described above, were adhered so that the high dielectric sheet faces were facing, and contact bonded. Through this, a layered body was formed wherein PET films, silicone-based pressure-sensitive adhesive layers, and separators were layered symmetrically on both faces of the two layers of high dielectric sheets.

Embodiment 3: Production of a Layered Body Equipped with a Structure Comprising Separator/Release Surface/(L2) Silicone-Based Pressure-Sensitive Adhesive Layer/(L4) Non-Silicone Thermoplastic Resin Layer/(L1) Dielectric Sheet A gel-type high dielectric sheet that is held between PET films was manufactured through curing, between two layers of PET films, one curable organopolysiloxane composition selected from Composition Examples 1 and 2. Following this, a layered body wherein a silicone-based pressure-sensitive adhesive agent sheet on the separator manufactured in Adjustment Example 1 was adhered onto each of the PET films so that the silicone pressure-sensitive adhesive agent sheet faces face the PET films. Through this, a layered body wherein PET films, silicone-based pressure-sensitive adhesive layers, and separators are layered symmetrically on both faces of a single layer of a high dielectric sheet was produced.

Preparation Example 2: Production of a Transparent Silicone-Based Pressure-Sensitive Adhesive Agent Sheet Formed on a Separator One curable organopolysiloxane composition, selected from Composition Examples 3 through 19, was coated onto a PET film (separator) that was provided with a release layer, so as to have a thickness of about 100 µm after curing. A layered body wherein a transparent silicone-based pressure-sensitive adhesive agent sheet that includes a dielectric functional group was formed on a PET film (separator) that was provided with a release layer was produced through resting for approximately 60 minutes at 70° C. followed by curing for 15 minutes at 150° C.

Embodiment 4: Production of a Layered Body Equipped with a Structure Comprising Separator/Release Surface/(L2) Silicone-Based Pressure-Sensitive Adhesive Layer/(L4) Non-Silicone Thermoplastic Resin Layer/(L1) Dielectric Sheet A gel-type high dielectric sheet that is held between PET films was manufactured through curing, between two layers of PET films, one curable organopolysiloxane composition selected from Composition Examples 1 and 2. Following this, a layered body wherein a transparent silicone-based pressure-sensitive adhesive agent sheet that includes a dielectric functional group on the separator manufactured in Adjustment Example 2 was adhered onto each of the PET films so that the silicone pressure-sensitive adhesive agent sheet faces face the PET films. Through this, a layered body wherein PET films, transparent silicone-based pressure-sensitive adhesive layers that include dielectric functional groups, and separators are layered symmetrically on both faces of a single layer of a high dielectric sheet was produced.

Embodiment 5

A layered body wherein silicone-based pressure-sensitive adhesive layers and separators were layered symmetrically onto both sides of a single-layer high dielectric sheet was produced identically to Embodiment 1, except that the gel-type high dielectric sheet structured from one organopolysiloxane cured material selected from Composition Examples 1 and 2 in Embodiment 1 has been replaced with a high dielectric sheet structured from one organopolysiloxane cured material selected from Composition Examples 3 through 19. Note that the high dielectric sheet is a layer that also functions as a transparent and silicone-based adhesive layer.

Embodiment 6

A layered body wherein PET films, silicone-based pressure-sensitive adhesive layers, and separators were layered symmetrically onto both sides of a double-layer high dielectric sheet was produced identically to Embodiment 2, except that the gel-type high dielectric sheet structured from one organopolysiloxane cured material selected from Composition Examples 1 and 2 in Embodiment 2 has been replaced with a high dielectric sheet structured from one organopolysiloxane cured material selected from Composition Examples 3 through 19. Note that the high dielectric sheet is a layer that also functions as a transparent and silicone-based adhesive layer.

Embodiment 7

The release layer on one face of the layered body manufactured in Embodiment 3 was peeled, to expose the pressure-sensitive adhesive layer. Following this, a PET film having an ITO electrically conductive layer (electrode layer) on one face thereof was adhered to a pressure-sensitive adhesive layer of the layered body according to Embodiment 3, described above, with the ITO electrically conductive layer facing the pressure-sensitive adhesive layer of the layered body, to form a layered body having a structure wherein an ITO electrically conductive layer and a pressure-sensitive adhesive layer are adhered together. Moreover, the release surface of one face of the layered body (=one of the two release faces of the layered body in Embodiment 3, corresponding to the release face that is not the place that has already been peeled) was peeled to expose a pressure-sensitive adhesive surface, and in the same manner as with the previous adhesion, a PET film having an ITO electrically conductive layer (electrode layer) on one face was adhered so that the ITO electrically conductive layer faced the pressure-sensitive adhesive layer, to manufacture a layered body having the structure described below.

Structure of the Layered Body: PET film/ITO electrically conductive layer/pressure-sensitive adhesive layer/PET film/dielectric silicone layer/PET film/pressure-sensitive adhesive layer/ITO electrically conductive layer/PET film Remarks: Of the structure described above, the structure of the "pressure-sensitive adhesive layer/PET film/dielectric silicone layer/PET film/pressure-sensitive adhesive layer" corresponds to the structure of the layered body of Embodiment 3, except for the release layer (separator) of both faces.

Embodiment 8

A gel-type high dielectric sheet held between PET films was manufactured through curing one curable organopolysiloxane composition, selected from Composition Examples 1 and 2, between two PET films. A silver electrically conductive paste was screen-printed onto one face of the PET film, and thermally cured, to manufacture a layered body equipped with a silver electrically conductive film (electrode layer) on the PET film (hereinafter termed a "layered body that includes a high dielectric sheet"). Following this, a silver electrically conductive paste was screen-printed onto a PET film, separate from the layered body described above, to manufacture a PET film with an electrode layer formed with a silver electrically conductive film (electrode layer) of a semi-cured state (hereinafter termed a "PET film with an electrode layer of a semi-cured state").

Finally, the PET film with the electrode layer in the semi-cured state was adhered, so that the silver electrically conductive film was facing, to the surface of the PET film that did not have the electrode layer of the layered body of the high dielectric sheet, and then the silver electrically conductive film was cured completely so as to secure the two faces, to manufacture a layered body with the structure set forth below. A pressure-sensitive adhesive layer was further provided on both faces of the layered body, to enable use as an embodiment according to the present invention (referencing the measurement in Application Example 2).

Structure: PET film/electrode layer/PET film/high dielectric silicone layer/PET film/electrode layer Application Example 1

In the structure of the layered body described in Embodiment 7, a layered body with an area of 5 cm×5 cm was manufactured using a gel-type high dielectric silicone sheet (150 μm thick), a PET film (50 μm thick), a silicone-based pressure-sensitive adhesive agent (50 μm thick), and a PET film with an ITO electrically conductive film (135 μm thick). Moreover, 1 cm×1 cm squares of ITO electrically conductive films were patterned into a 3×3 matrix, and leads were connected to each column. Electrodes were disposed so as to overlap the top and bottom leads, crossing at 90°. The matrix pattern of the electrode layer (the ITO electrically conductive film) is depicted in FIG. 5.

Measurement Example 1

An LCR meter U1732C (manufactured by KEYSIGHT) was connected to the vertically middle lead of the layered body obtained in Application Example 1, and the other leads were connected to the guard of the device. A silicone pressure-sensitive adhesive layer (50 μm thick) and a 0.2-mm glass sheet were adhered to one face of the layered body, and the electrostatic capacitance was measured for 30 seconds each with weights of different masses placed on the center electrode from above. The applied loads and the changes in the electrostatic capacitance are given in Table 4.

Application Example 2

In the structure of the layered body described in Embodiment 8, a layered body with an area of 5 cm×5 cm was manufactured using a gel-type high dielectric silicone sheet (150 μm thick), a PET film (50 μm thick), and a PET film (75 μm thick) on which is formed an electrode layer made from a silver conductive film (35 μm thick) and a silver conductive film in a semi-cured state (35 μm thick at the time of curing). The silver conductive film was formed by screen-printing a silver conductive paste (manufactured by Ajanomoto FineTechno) onto the PET film on one side that is holding a gel-type high dielectric sheet, and thermally curing at 100° C. for one hour. On the other hand, the silver conductive film in the semi-cured state (35 μm thick at the time of curing) was formed by screen-printing a silver conductive paste (manufactured by Ajanomoto FineTechno) onto 75-μm-thick PET film. Note that the silver conductor layer of the semi-cured state, after bonding together, was thermally cured, to secure both surfaces.

On this layered body, in the same manner as with Application Example 1, 1 cm×1 cm squares of silver conductive films were patterned into a 3×3 matrix, and leads were connected to each column. Electrodes were disposed so as to overlap the top and bottom leads, crossing at 90°. FIG. 7 shows a cross-sectional view (side view) of the layered body. FIG. 6 shows a top view of the layered body. Note that this layered body is used through further providing a pressure-sensitive adhesive layer, as shown in the "measurement example 2," in the next section.

Measurement Example 2

An LCR meter U1732C (manufactured by KEYSIGHT) was connected to the vertically middle lead of the layered body obtained in Application Example 2, and the other leads were connected to the guard of the device. In the same manner as with Adjustment Example 1, a silicone pressure-sensitive adhesive layer (50 μm thick) and a 0.2-mm glass sheet were adhered to the surface of the silver conductive film of the layered body, and the electrostatic capacitance was measured for 30 seconds each with weights of different masses placed on the center electrode from above. The applied loads and the changes in the electrostatic capacitance are given in Table 4.

As can be changed from the results in Table 4, it can be understood that, through the use of the layered body according to the present invention, the electrostatic capacitance will change linearly in a form corresponding with the load. Use as a sensor, for example, is envisioned. An optically transparent sensor can also be manufactured through using ITO, or the like, in the electrode.

TABLE 4

| Load (g/mm$^2$) | Ratio of Change of Capacitance in Measurement Example 1 (%) | Ratio of Change of Capacitance in Measurement Example 2 |
|---|---|---|
| 0.07 | 1.4 | 0.3 |
| 0.09 | 2.0 | 1.3 |
| 0.11 | 3.2 | 2.3 |
| 0.16 | 6.0 | 4.8 |
| 0.21 | 8.6 | 7.1 |

The layered body of FIG. 1 has a structure wherein electrode layers are provided on both faces of a high dielectric sheet, and silicone-based pressure-sensitive adhesive layers are provided on both sides thereof.

The layered body of FIG. 2 has a structure wherein PET films are provided on both faces of a high dielectric sheet, and silicone-based pressure-sensitive adhesive layers are provided on both sides thereof.

The layered body of FIG. 3 has separators, equipped with release surfaces facing the silicone-based pressure-sensitive adhesive layers, on the outsides of the silicone-based pressure-sensitive adhesive layers of the layered body in FIG. 1.

The layered body of FIG. 4 has a structure wherein PET films are provided on both sides of a high dielectric layer, pressure-sensitive adhesive layers are provided on both sides thereof, and a PET film having an electrode layer is further provided.

FIG. 5 is a top view of electrodes wherein 1 cm×1 cm squares are patterned into a 3×3 matrix on a PET film.

FIG. 6 is a layered body top view wherein a high dielectric sheet and a PET film are disposed between layered bodies (3+4) that include electrode layers and PET films, with the electrodes of FIG. 5 shifted by 90° vertically.

The layered body of FIG. 7 is a cross-sectional drawing of the layered body of FIG. 6.

EXPLANATION OF REFERENCE SYMBOLS

1: Single Layer or Multiple Layers of a High Dielectric Sheet that Includes a Polymer Cured Body Having a Dielectric Functional Group: (EAP)

2: Silicone-Based Pressure-Sensitive Adhesive Layer: (PSA)
3: Electrode Layer: (EL)
3a: Electrode 1
3b: Electrode 2
3c: Electrode 3
4: Polyethylene Terephthalate (PET) Film
5: Separators Comprising a Release Surface Facing a Layer Surface 2

The invention claimed is:

1. A layered body comprising:
a high dielectric sheet (L1) having a relative dielectric constant at 1 kHz and 25° C., of no less than 5, the high dielectric sheet (L1) including a polymer cured material having a dielectric functional group, wherein the polymer cured material is of a curable organopolysiloxane composition that includes at least an organopolysiloxane that includes fluoroalkyl groups, where at least 10 mol % of all substituents for silicon atoms are trifluoropropyl groups;
two electrode layers (L3), two non-silicone thermoplastic resin layers (L4) and two pressure-sensitive adhesive layers (L2); wherein the high dielectric sheet (L1) is directly disposed between each of the two non-silicone thermoplastic resin layers (L4); wherein each of the two pressure-sensitive adhesive layers (L2) are directly disposed on each of the two non-silicone thermoplastic resin layers (L4) and wherein each of the two electrode layers (L3) are directly disposed on each of the two pressure-sensitive adhesive layers (L2).

2. The layered body as set forth in claim 1, further comprising two additional non-silicone thermoplastic resin layers (L4), wherein each of the two additional non-silicone thermoplastic resin layers are directly disposed on each of the two electrode layers (L3) respectively.

3. The layered body as set forth in claim 1, wherein each of the high dielectric sheet (L1) and each of the two pressure-sensitive adhesive layers (L2) are substantially transparent.

4. The layered body as set forth in claim 1, wherein the polymer cured material has a shear storage modulus in a range of between $10^3$ and $10^5$ Pa at 23° C.

5. The layered body as set forth in claim 1, wherein each of the two pressure-sensitive adhesive layers (L2) are silicone-based pressure-sensitive adhesive layers comprising a cured material of a curable silicone composition comprising:
(A) a straight or branched organopolysiloxane having an average number of curing reaction functional groups in the molecule in excess of 1;
(B) an organopolysiloxane resin; and
(C) a curing agent.

6. An electrical or electronic component, transducer, or display device that includes the layered body as set forth in claim 1.

7. A transducer member or a display device member comprising the layered body as set forth in claim 1.

8. A method for manufacturing a device selected from the group consisting of an electrical or electronic component, a transducer, or a display device, said method comprising:
placing, within the device, the layered body as set forth in claim 1.

* * * * *